(No Model.) 2 Sheets—Sheet 1.
J. DUNCAN.
VEHICLE RUNNING GEAR.
No. 550,489. Patented Nov. 26, 1895.
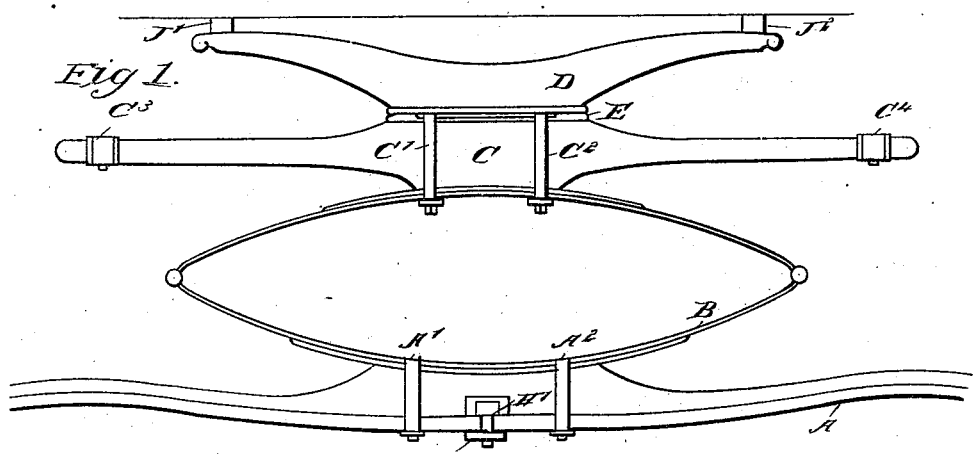
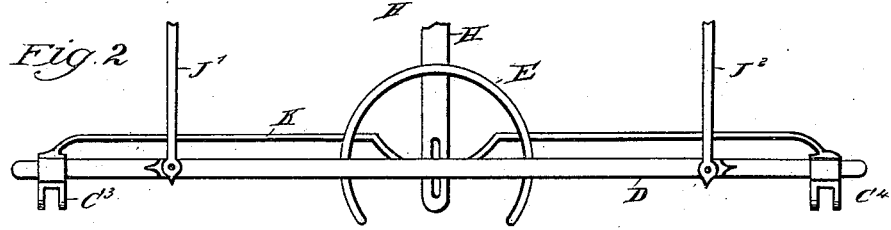
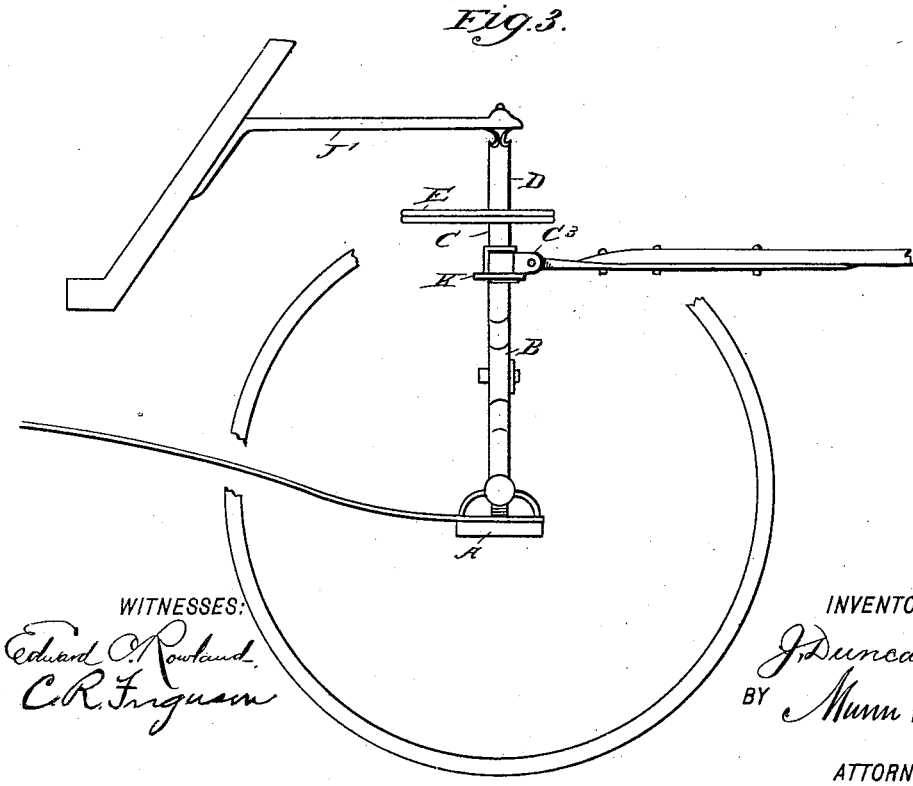
WITNESSES:
INVENTOR
J. Duncan
BY Munn & Co.
ATTORNEYS.

(No Model.) 2 Sheets—Sheet 2.

J. DUNCAN.
VEHICLE RUNNING GEAR.

No. 550,489. Patented Nov. 26, 1895.

WITNESSES:
Edward C. Rowland
C. R. Ferguson

INVENTOR
J. Duncan
BY
Munn & Co
ATTORNEYS.

UNITED STATES PATENT OFFICE.

JAMES DUNCAN, OF ADELAIDE, SOUTH AUSTRALIA.

VEHICLE RUNNING-GEAR.

SPECIFICATION forming part of Letters Patent No. 550,489, dated November 26, 1895.

Application filed April 12, 1895. Serial No. 545,498. (No model.) Patented in South Australia November 11, 1890, No. 1,769; in Victoria January 15, 1892, No. 9,382; in New South Wales March 14, 1893, No. 4,317, and in New Zealand June 19, 1894, No. 6,910.

*To all whom it may concern:*

Be it known that I, JAMES DUNCAN, coach-builder, a subject of the Queen of Great Britain, and a resident at Franklin Street, Adelaide, in the Province of South Australia, have invented an Improved Means of Attaching Shafts and Poles to Buggies and other Four-Wheeled Road-Vehicles, (for which I have obtained Letters Patent in South Australia, No. 1,769, dated November 11, 1890; in Victoria, No. 9,382, dated January 15, 1892; in New South Wales, No. 4,317, dated March 14, 1893, and in New Zealand, No. 6,910, dated June 19, 1894,) of which the following is a specification.

This invention applies to buggies and other four-wheeled road-vehicles having what is known as the "American fore-carriage"—that is to say, having the front springs (one or more) parallel with the front axle, as commonly used in buggies, phaetons, and other vehicles built in America—and to vehicles having an improved boss fore-carriage, as hereinafter referred to.

The poles and shafts have heretofore been attached to the axle of such vehicles below the springs and the spring-bed and a perch or reach employed to connect the front axle to the hind axle or carriage-body and supply the required rigidity. The shaft ends or pole ends have been jointed or attached to lugs or joints which were secured by clips or like means to the front axle or some other part below the springs. Owing to the joints being thus made below the springs, there is a great deal of friction, wear, and rattle therein as the vehicle passes over metal or hard roads. I have discovered that this defect can be overcome by the employment of a special spring-bed which is extended so as to also form a draft-bar, at the two ends of which are provided lugs or joints. These are fitted to and receive the shaft ends or pole-bracket ends, and the joints being above the springs the rattle and the wear of the shaft ends and the lugs are prevented or greatly reduced.

In order that my invention may be clearly understood, I will now describe the same by reference to the accompanying drawings, in which—

Figure 4:
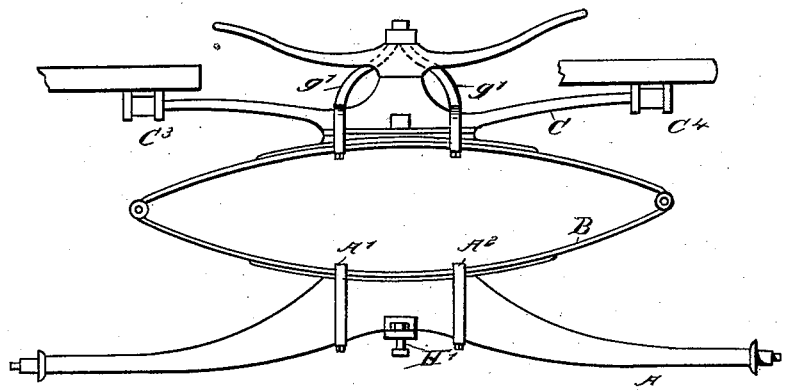
Figure 5:
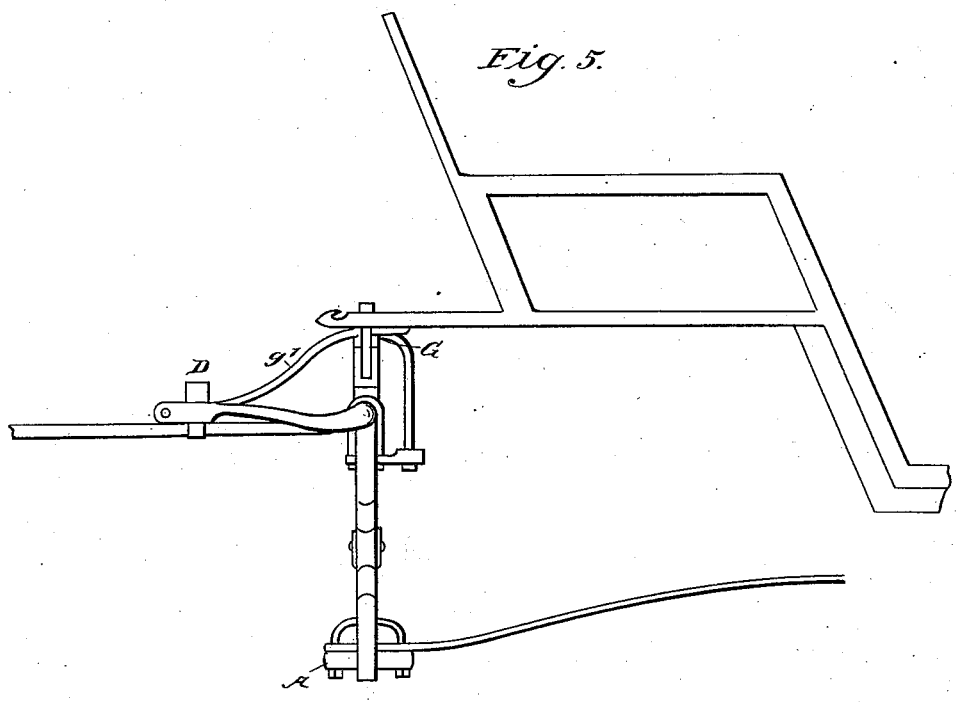

Figures 1, 2, and 3 are a front view, a plan, and a side view, respectively, of a cross-spring fore-carriage with my specially-formed spring-bed serving also as a draft-bar. Figs. 4 and 5 are front and side views of a fore-carriage with my improvement applied to a vehicle having a boss fore-carriage in place of the circular wheel-plates.

The same letters indicate the like parts in all the figures.

A is the axle, and A' A² the clips which secure the spring B thereto.

C is the spring-bed, and C C² the clips which secure it to the upper part of what I term conjointly the "spring" B.

D is the top-bed, to which the carriage-body is screwed or otherwise fastened.

E is the fifth-wheel, upon which the carriage turns; H, the perch; H', the king-bolt and D-iron attaching the same to axle.

J' J² are portions of the frame or pump-handle used for connecting the carriage-body.

K is a stay-bar secured at the center by the two clips C' C² and connected to the shaft-joints.

C³ C⁴ are the shaft-joints, which are attached to the spring-bed C by clips or like convenient means.

Figs. 4 and 5 illustrate the attachment of shafts or pole, according to my invention, to a boss fore-carriage, as fully described and illustrated in my boss fore-carriage patent. When shafts are used, the attachment is precisely the same as before described, the shaft-lugs, being formed on the end of the spring-bed, also forming a draft-bar, as illustrated in Fig. 4. When a pole is used, an additional stay g' is provided, extending downward and forward from the collar G to the splinter-bar D, strengthening the same sufficiently to permit the use of a fixed pole, as shown in Fig. 5.

Having now particularly described and ascertained the nature of my said invention and in what manner the same is to be performed, I declare that what I claim is—

1. The combination with an axle, of the spring secured to the central portion of the axle and extended longitudinally thereof, the spring bed rigidly secured on the upper side of spring and extended parallel therewith, a shaft fastening clip at each end of said spring bed, the said ends being free from the spring, a top bed above the spring bed and a fifth-wheel or pivotal connection between the top bed and spring bed, substantially as specified.

2. The combination with an axle and a spring arranged parallel therewith, the spring bed on and parallel with the spring, the clips for securing the spring bed to the spring, the coupling clips at the outer ends of the spring bed, brace rods extending from the first named clips to a connection with the coupling clips, and the pivoted top bed, substantially as specified.

In testimony that I claim the foregoing as my invention I have signed my name, in presence of two witnesses, this 14th day of February, 1895.

JAMES DUNCAN.

Witnesses:
CHARLES NICHOLAS COLLISON,
ARTHUR GORE COLLISON.